United States Patent [19]

Brinton

[11] Patent Number: 4,977,849
[45] Date of Patent: Dec. 18, 1990

[54] VEHICLE IN DISTRESS FLAG

[76] Inventor: Alice R. Brinton, 3200 Lockheed Blvd., Apt. 102, Alexandria, Va. 22306

[21] Appl. No.: 497,137

[22] Filed: Mar. 21, 1990

[51] Int. Cl.⁵ .................. B60Q 1/52; G09F 17/00
[52] U.S. Cl. .................. 116/28 R; 116/173; 340/472
[58] Field of Search ............... 40/591, 592, 601, 603, 40/604, 610; 116/28 R, 173, 209, 281, 283; 340/471–473; 343/721

[56] References Cited

U.S. PATENT DOCUMENTS

| | | | |
|---|---|---|---|
| 2,420,772 | 5/1947 | Dalton | 343/720 |
| 2,819,547 | 1/1958 | Clements, Jr. | 40/610 |
| 2,953,934 | 9/1960 | Sundt | 343/715 |
| 3,105,459 | 10/1963 | Conn | 116/209 |
| 3,117,549 | 1/1964 | Ripepe | 116/173 |
| 3,143,722 | 8/1964 | Murch | 340/472 |
| 3,439,326 | 4/1969 | Boudin | 340/472 |
| 3,675,616 | 7/1972 | McInnis | 116/173 |
| 4,020,335 | 4/1977 | Bisceglia | 340/472 |
| 4,603,333 | 7/1986 | Carlson | 343/709 |
| 4,934,972 | 6/1990 | Shumway et al. | 441/69 |

Primary Examiner—William A. Cuchlinski, Jr.
Assistant Examiner—W. Morris Worth

[57] ABSTRACT

Self-opening and closing flag material (20) is mounted on a largest flagpole element (34) of a telescoping flagpole and this element can be extended on a smaller element from an elongated compartment (14) of a motor vehicle (10) upon depression of a switch (50) from within the motor vehicle for signalling others of distress. The automatically-deployed flag material is attached to a spar (18a, 18b) which is hingedly attached to the largest flagpole element and the flexible flag material is connected between the largest flagpole element and the spar. When the spar is moved out of the elongated compartment it is biased to hinge away from the largest flagpole element, thereby expanding the flexible flag material into the shape of a V. When the spar is moved into the elongated compartment, it is automatically hinged to close the flexible material against the largest flagpole element.

6 Claims, 1 Drawing Sheet

VEHICLE IN DISTRESS FLAG

BACKGROUND OF THE INVENTION

This application is related to application number 941,028, filed Dec. 12, 1986, now abandoned.

This invention relates broadly to the art of automobile distress signals, and more particularly to a distress flag which can be deployed outside of a vehicle by activating a switch from within the cab of the vehicle.

The use of this flag would serve many purposes. It's chief purpose is to PREVENT accidents from happening. It is desperately needed on the highways today, particularly where there are so many lanes of traffic. The motorists are travelling fast, the highways are crowded and there is seldom ever enough room on either side of the highway for a driver to find a safe place to stop. Therefore, the purpose of this "VID" flag is to assist any motorist in getting his vehicle off the road safely when the need arises. With this distress flag, all one has to do is push a button to activate the flag and all motorists can see it, from all directions, near and far, in front, beside or behind the distressed vehicle. Other drivers will then know immediately that this vehicle is in trouble and they will slow down, move over and assist this motorist in getting his vehicle off the highway safely. The way it is on the highways today, the driver of any vehicle who develops an emergency situation, has to risk his own life when he breaks down and stops or makes an attempt to get off the road.

This distress flag will serve other purposes: When a driver does signal an emergency, not only will he be able to get off the highway safely, but he will also be "protected" with the distress signal. The "VID" will automatically signal for help from other motorists, police officers, safety officers and other properly equipped personnel and vehicles to come to his rescue. As it presently is today, if a motorist is lucky enough to get off the highway without being hit, then he is "stranded" along the highway or a road somewhere and he becomes a victim of circumstances. He has to get out of his vehicle and call or wave to any passing motorist to ask for assistance. This is a very dangerous and terrifying situation and how many times have people (especially women) been robbed, kidnapped, raped, and even murdered, while they were waiting for help to come.

It is my very strongest belief that this distress signal would far excel all the other safety equipment and forms of safety devices that are presently being used, for example; seat belts, care seats for babies and small children, helmets for cyclists and now, air bags. All of these are for the prevention of injury or death WHEN an accident happens but WHAT ARE WE DOING TO PREVENT THE ACCIDENT FROM HAPPENING IN THE FIRST PLACE? This Vehicle in Distress flag would save millions of lives and millions of dollars that are being paid out for hospital and medical bills, insurance claims, law suits etc. The "VID" would also be a feeling of security and protection for the motorist who is on this Nation's highways today and this is why it has been given the title of VEHICLE IN DISTRESS FLAG (The "VID") . . . "The Light of Hope—in Trouble—and in Darkness." It is an object of this invention to provide a distress flag assembly for an automobile which can be deployed by a driver thereof while he or she is still in the cab of the vehicle. In this regard, it is an object of this invention to provide a distress flag assembly which allows deployment of a distress flag either while the vehicle is still moving or has stopped operating without requiring the driver thereof to get out of the car.

Similarly, it is an object of this invention to provide a distress flag assembly having a distress flag which can be easily stored in a compartment of a vehicle without occupying undue space, but yet which has a flag element which automatically expands and contracts when it is extended out of and pulled into the compartment.

Similarly, it is an object of this invention to provide a distress flag for motor vehicles which can be easily seen by other motorists but yet which does not take up undue space in a motor vehicle.

Still further, it is an object of this invention to provide a distress flag assembly which is relatively easy and inexpensive to manufacture and service but yet which is extremeley effective in operation.

SUMMARY

According to principles of this invention, a motor-vehicle distress flag assembly comprises an inverted telescoping flagpole with an automatically-opening flag mounted on a largest flagpole element thereof. The largest flagpole element can be slid on smaller telescoping flagpole elements into and out of an elongated compartment in the motor vehicle. When it is slid into the elongated compartment, a spar which is hinged to the elongated element, is automatically pivoted to a position adjacent the largest element by a mouth of the elongated compartment thereby folding up flexible flag material mounted between the spar and the largest flagpole element. Similarly, when the largest flagpole element is moved out of the elongated compartment, the spar is biased to pivot away from the largest flagpole element thereby expanding the flexible flag material to deploy the flag. In one embodiment, the distress flag assembly also has multicolored lights thereon to attract other motorist's attention at night.

BRIEF DESCRIPTION OF THE DRAWING

The foregoing and other objects features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1A:
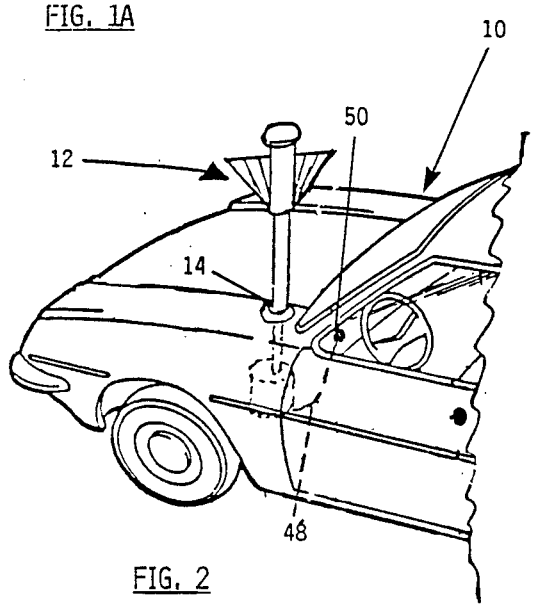
FIG. 1A is an isometric view of a front portion of an automobile having a distress flag assembly of this invention mounted thereon with the distress flag thereof being deployed.
Figure 1B:
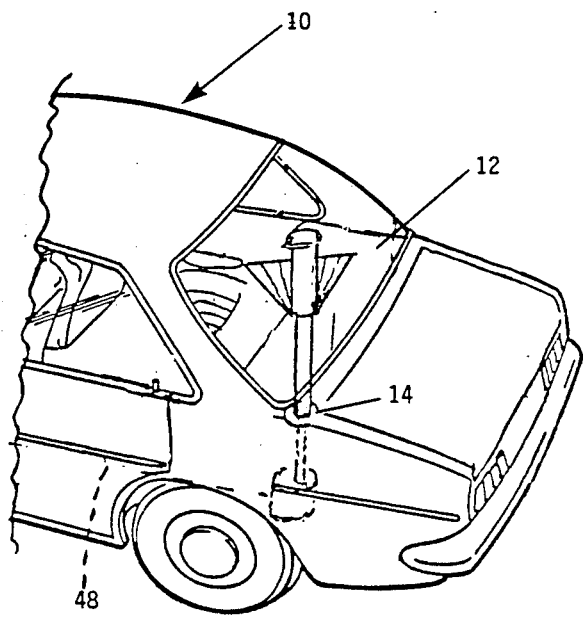
FIG. 1B is an isometric view of a rear portion of an automobile having a distress flag assembly of this invention mounted therein with the distress flag thereof being deployed.

An automobile 10 has a distress flag assembly 12 of this invention mounted thereon. The flag assembly can be mounted in the front, as shown in FIG. 1A, or in the rear, as shown in FIG. 1B. The distress flag assembly 12 includes broadly an elongated compartment 14, a telescoping flagpole 16, two hinged spars 18a and 18b, flexible flag material 20, a stopper 22, and a motivating system 24. The elongated compartment 14 has a circular lip 26 for forming an open exit mouth 28 through which the distress flag is deployed and withdrawn.

Figure 2:
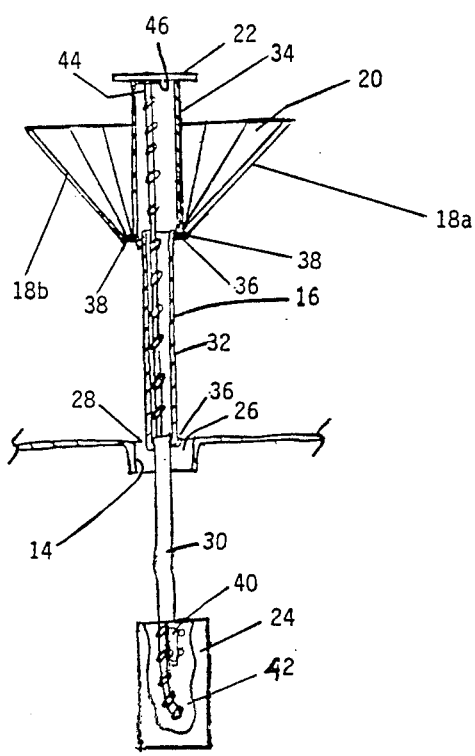
FIG. 2 is a segmented, partially-sectional side view of the flagpole assembly of FIG. 1 showing a portion of an automobile thereof forming an elongated compartment of the distress flag assembly; and, FIG. 3 is a view similar to FIG. 2 with the flag thereof being withdrawn and with an embellishment including a multicolored light thereon.

The telescoping flagpole 16 is comprised of three, tubularly-shaped, telescoping flagpole elements 30, 32, and 34, each of which is respectively slightly larger than the other so that each successively larger flagpole element can be slid on the outside surface of the successively smaller flagpole element. Thus, flagpole element 32 can be slid on flagpole element 30 and flagpole element 34 can be slid on flagpole element 32. There are crimped stops 36 at the respective ends of the flagpole elements to prevent them from being completely slid off of one another when they are extended as is shown in FIG. 2.

Hinged spars 18a and 18b are attached to the largest flagpole element 34 near its lower end by hinges 38. In this respect these spars 18a and 18b are made of thin but rather heavy plastic and are attached to a bottom edge of flexible flag material 20 to pull the flag material to an open, deployed state as shown in FIGS. 1 and 2 when the telescoping flagpole 16 is extended out of the elongated compartment 14. In this respect, the hinged spars 18a and 18b are weight-biased to expand the flexible flag material 20, however, springs could also be used for this purpose. The flexible flag material 20 is attached along side edges thereof to the largest flagpole element 34 so that by rotating the spars 18 away from the largest flagpole element 34 about the hinges 38, the flexible flag material 20 is "fanned" open. In this respect, the flexible flag material, in the preferred embodiment, is a very thin plastic material folded fan style, however, it could be composed of any cloth-like material and need not have fold lines, although the material depicted in FIG. 2 does have such fold lines. The flexible flag material 20 has an extremely bright and luminescent color and could have reflectors thereon. The flexible flag material is shaped to roughly form a V-shape when it is deployed.

The motivating system 24 is depicted as having a driven rotating member 40 for meshing with a flexible, elongated, threaded, wire 42 so as to extend the threaded wire 42 upwardly out of the mouth 28 of the elongated compartment 14 or to pull the threaded wire 14 down into a housing of the motivating system 24. In this respect, the actual motor and motor linkages for driving the driven rotating member 40 are not shown in the drawings, however, this system is fully described in U.S. Pat. No. 2,953,934 to Sundt, and insofar as is necessary to understand this invention, the disclosure in that patent is incorporated herein by reference. It is pointed out, however, that other driving systems are also available such as those depicted and described in U.S. Pat. No. 3,675,616 to McInnis and U.S. Pat. No. 2,420,772 to Dalton. Any of these systems will work equally as well in this invention. It should be noted that an outer end 44 of the threaded wire 42 is attached to the outer end 46 of the largest flagpole element 34 and that the threaded wire 42 passes through bores of all of the flagpole elements 30, 32, and 34. Thus, when the rotating member 40 is turned in a first direction to drive the treaded wire 42 outwardly, it slides each successively larger flagpole element 32 and 34 on the adjacent smaller flagpole element 30 and 32 so as to extend the flagpole outside of the elongate compartment 14. The smallest flagpole element 30 is anchored to the motivating system 24 while the largest element 34 is extended. When the rotating member 40 is turned in the opposite direction, the flagpole is retracted.

The stopper 22 is constructed of a flexible material such as rubber and is attached on the outer end 46 of the largest flagpole element 34. The purpose of this stopper is to cover the mouth 28 of the elongated compartment 14 when the distress flag is withdrawn into the elongated compartment 14 as is depicted in FIG. 3.

A motor (not shown) in the motivating system 24 is activated and deactivated via a line 48 by operation of a push button switch 50 mounted near a driver in a cab of the automobile 10 to provide activating power to the motivating system 24. It should be understood that appropriate connections are also made, although not depicted in the drawings, to appropriate power sources, such as the electrical systems of the automobile 10, in order to drive a motor (not shown) of the motivating system 24.

Figure 3:
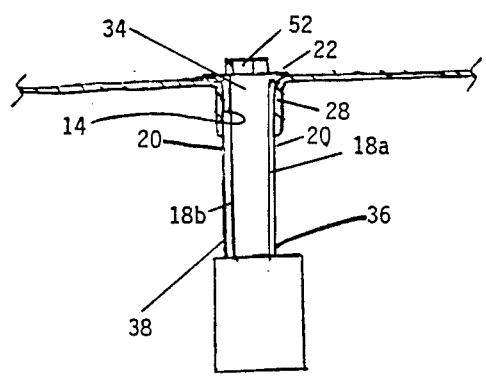

Describing now operation of the distress flag assembly 12 of this invention, normally, the distress flag material 20 and the spars 18a and 18b will be rotated on the hinges 36 and 38 against the largest flagpole element 34 and the largest flagpole element 34 will be situated in the elongated compartment 14 as is depicted in FIG. 3. However, when a driver, or passenger, of the automobile 10 depresses the push-button switch 50, a motor (not shown) in the motivating system 24 is activated to rotate the driven rotating member 40 and thereby extend the threaded wire 42 through the mouth 28 of the elongated compartment 14, in turn sliding the largest flagpole element 34 and the middle flagpole element 32 respectively upwardly on the middle flagpole element 32 and the smallest flagpole element 30. Thus, the flagpole is extended out of the elongated compartment 14 as is depicted in FIG. 2. When this happens, the weight of the spars 18a and 18b causes them to swivel away from the largest flagpole element 34 on their hinges 38 and thereby open the easily visible flexible flag material 20. When the push-button switch 50 is again actuated, the motor (not shown) again rotates the driven rotating member 40 to store the threaded wire 42 in a housing of the motivating system 24 and pull the outer end 44 thereof into the elongated compartment 14. The wire, in turn, causes the largest flagpole element 34 and the middle flagpole element 32 to slide downwardly, respectively, on the middle flagpole element 32 and the smallest flagpole element 30 to be pulled into the elongated compartment 14. As this happens, the circular lip 26 of the mouth 28 of the elongated compartment 14 provides upward force on the spars 18a and 18b causing them to swivel upwardly against the outside surface of the largest flag pole element 34, thereby folding up the flexible flagpole material 20 and allowing the largest flagpole element 34 to be pulled inside the elongated compartment 14 as is shown in FIG. 3.

In an embellished embodiment, which is depicted in FIG. 3, a multicolored light 52 is included on top of the stopper 22 and this light is turned on when the distress flag is deployed in order to attract greater attention at night. Otherwise, this embodiment works much in the same manner as has already been described. It is also possible to provide a swirling effect to the multicolored light 52.

It will be appreciated by those of ordinary skill in the art that the distress flag assembly described herein, because of the inverted telescoping flagpole elements, allows a rather large flag to be mounted on the outer surface of the outer telescoping element so that this flag can be easily deployed and folded up to fit a relatively small compartment. If the telescoping flagpole were constructed in the normal manner, with the smaller elements being extended outside the vehicle, it would not be possible to mount a flag on the outer surface thereof and have this element telescope into a larger element below it. Thus, with the structure of this invention it is possible to store the flag material 20 and spars 18a and 18b in a smaller space than is otherwise necessary for such a large flag. Also, it is possible to easily construct a flag which is automatically deployed and folded up when it is moved out of, and into, the elongated compartment.

While the invention has been particularly shown and described with reference to a preferred embodiment, it will be understood by those skilled in the art that various changes in form and detail may be made therein without departing from the spirit and scope of the invention. The location of the flag assembly depends to some extent on the location of unused space for particularly configured vehicles. Along these lines, it would be possible to mount the distress flag assembly in the front wheel well as shown in FIG. 1A, in the trunk space, as shown in FIG. 1B as well as in other places on an automobile. Also, spars 18a and 18b could be nothing more than reenforced outer edges of flexible flag material 20, with the flexible hinge material itself forming the hinges. In this case the flag material could have spring in it to bias it to an open position when it is free of the compartment mouth 28 rather than using spar weight.

The embodiments of the invention in which an exclusive property or privilege are claimed are defined as follows:

1. A motor-vehicle distress flag assembly comprising:
   an elongated compartment for housing a flag and a telescoping flagpole therein, said compartment being open at an exit end thereof;
   a telescoping flagpole comprised of a plurality of tubularly-shaped flagpole elements being arranged with a smallest of said plurality of elements thereof anchored in the compartment with succeedingly larger elements being mounted thereon, said larger elements being slidable so that they can be extended out of the exit end of the compartment;
   a flag mounted on an outside surface of a largest of said plurality of elements, means for automatically folding said flag against the outside surface of said largest element when said largest element is withdrawn into said compartment and means for automatically opening said flag to an expanded configuration when said largest element is moved out of said compartment;
   a motivating means connected to said largest element for extending and withdrawing said flagpole;
   said motivating means including a switch located in a cab of said motor vehicle for activating said motivating means;
   whereby, when a driver of said motor vehicle is in distress, the switch is activated, thereby deploying said flag to signal the driver's distress to others.

2. A motor vehicle distress flag assembly as in claim 1, wherein said flag comprises an elongated spar, means for hingedly attaching one end of said spar to the largest flagpole element, means for biasing a distal end of said spar away from said largest element and a flexible flag material mounted between the spar and the outside surface of said largest element; whereby when said largest element is extended outside said elongated compartment, said spar is biased to pivot outwardly away from said largest element to thereby expand the flexible flag material and when said largest element is withdrawn into said compartment said spar is automatically pivoted toward said largest element thereby folding up said flag material.

3. A motor vehicle distress flag assembly as in claim 2, wherein there are two spars and said flag opens in two directions.

4. A motor vehicle distress flag assembly as in claim 2, wherein the weight of said spar is the biasing means.

5. A motor vehicle distress flag assembly as in claim 2, wherein said flag is automatically closed when said flagpole is withdrawn into said elongated compartment by said spar contacting a mouth of said compartment which causes said spar to be folded against said largest flagpole element.

6. A motor vehicle distress flag assembly as in claims 1, 2, 3, 4 or 5, wherein a multi-colored light is mounted on a stopper in a top portion of said largest element.

* * * * *